S. T. Field,
Wood Molding Machine.

Nº 22,792.        Patented Feb. 1, 1859.

Witnesses
D. W. Field
Robert Peckham

Inventor
Samuel T. Field

UNITED STATES PATENT OFFICE.

SAMUEL T. FIELD, OF WORCESTER, MASSACHUSETTS.

MACHINE FOR MANUFACTURING WOODEN TROUGHS.

Specification of Letters Patent No. 22,792, dated February 1, 1859.

*To all whom it may concern:*

Be it known that I, SAMUEL T. FIELD, of the city and county of Worcester, State of Massachusetts, have invented certain new and useful Machines for the Manufacture of Wooden Gutters, of which the following is a full, clear, and exact description, reference being had to the accompanying drawing, forming part of this specification, in which—

Figure 1:
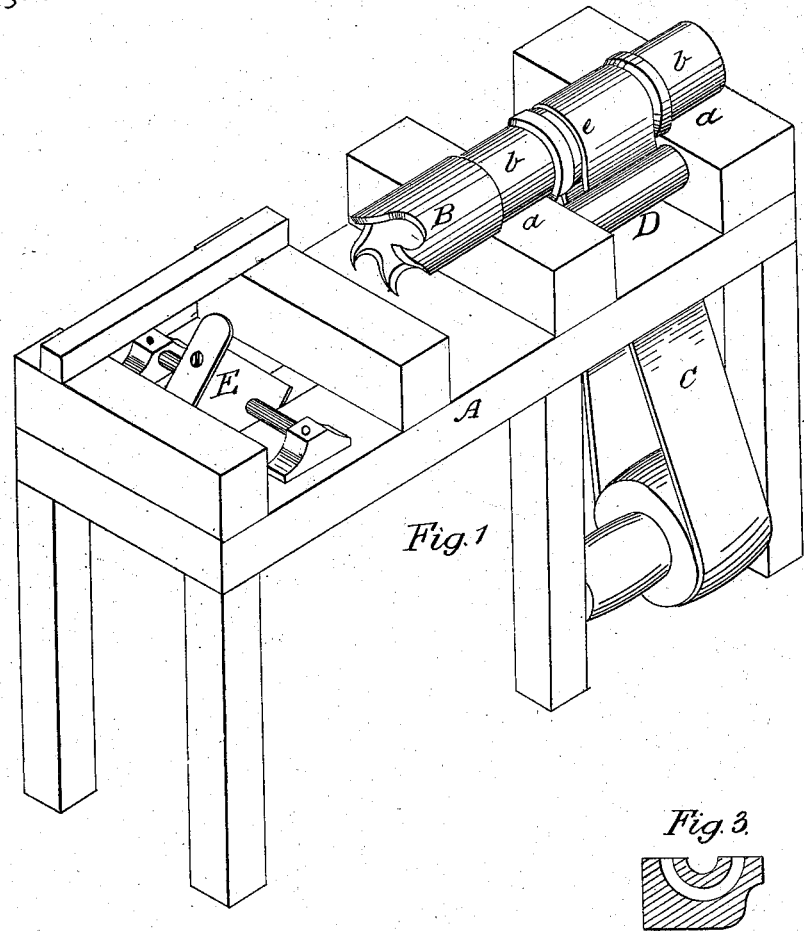
Figure 3:
Figure 2:
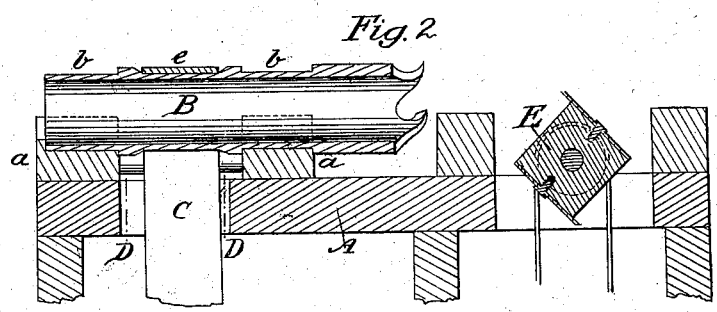

Figure 1 represents a perspective view of my gutter machine. Fig. 2 represents a vertical longitudinal section. Fig. 3 represents a transverse section through the gutter, and the part cut out by the saw.

A machine for sawing out curved wooden gutters and spouts from the solid stick has long been a desideratum in the trade. Heretofore these gutters have been made by forming the groove in the stick by hand with a curved adz, and then smoothing and finishing the groove with a curved plane. This process is slow and expensive, and wastes the material removed to form the groove in the gutter, which being cut into chips by this process is not available in the manufacture of other articles.

The object of my invention is to saw out the curved groove in the stick to form the gutter, so that the part sawed off will be in one piece, and also to manufacture the piece while being sawed out, into some other article as spouts or moldings; and the first part of my invention consists in arranging a cylindrical saw and its driving mechanism in such manner as to saw a semicircular groove and allow the stick to pass over the surface of the saw in the direction of its axis, while the piece sawed out passes through the saw without either interfering with the driving mechanism; and the second part of my invention consists in combining with a cylindrical saw thus arranged a grooving or molding cutter so arranged as to cut a groove or form a molding in the core while it is being sawed from the stick to form the gutter groove, thereby at one operation producing two articles.

In the accompanying drawing is represented my machine for sawing curved gutters.

A table or bed plate (A) supports a cylindrical saw (B) which rests and turns in semiboxes (*a*) that only extend as high as the axis. The journals (*b*) of the saw are formed by grooving its surface slightly, leaving a light flange to prevent end motion, and between the journals a groove (*c*) is made in the periphery of the saw of sufficient depth to admit a driving band (C) and keep its surface below that of the saw. On one side of the saw is a friction guide roller (D) between which and the saw the band (C) passes to a band wheel below the table, thus the band is kept in the groove— and below the surface of the saw so as not to interfere with the material while being sawed, and obstruct its passage over the surface of the saw.

In front of the saw and in line with its axis is a small grooving cutter (E) which may be made in any required shape to groove or form a molding in the piece cut out by the saw. This cutter may be banded from below in the same manner as the saw, to a pulley on the cutter shaft so as not to interfere with the stick passing over it as it is fed up to the saw.

It will be seen from the arrangement of the journals, the boxes in which the saw runs, and also the band, that one half of the exterior surface of the saw is unincumbered, while the interior is also unobstructed, so that with a saw thus arranged, a semicircular groove may be cut in a stick, passing over the saw in line with its axis, while the core passes through the center. In saws as heretofore arranged this was not possible as the driving mechanism, and also the bearings of the saw covered so much of the surface either on the interior or exterior that only a segment of a circle much less than the semicircumference could be sawed out with them therefore they could not be applied to the sawing of gutters which requires a deep semicircular groove.

Having thus described my improvements in machines for sawing gutters, what I claim therein as new and desire to secure by Letters Patent is—

1. Arranging the bearings of the saw and the mechanism by which it is driven substantially as described whereby the upper surface and also the interior of the saw is left unobstructed for the purpose set forth.

2. I also claim in combination with a cylindrical saw a secondary cutter arranged substantially as described so as to groove the core of the stick while it is being sawed out by the cylindrical saw.

In testimony whereof I have subscribed my name.

SAMUEL T. FIELD.

Witnesses:
WALTER GALE,
CALVIN E. PRATT.